US012244662B2

(12) United States Patent
Daniel et al.

(10) Patent No.: US 12,244,662 B2
(45) Date of Patent: *Mar. 4, 2025

(54) CONNECTED CLOUD APPLICATIONS

(71) Applicant: SLCKET, Inc., Overland Park, KS (US)

(72) Inventors: Jeffrey Christopher Daniel, Columbia, MO (US); Manzilla Queen, Kansas City, MO (US)

(73) Assignee: SLCKET, Inc., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,544

(22) Filed: Sep. 20, 2023

(65) Prior Publication Data
US 2024/0015201 A1    Jan. 11, 2024

Related U.S. Application Data

(63) Continuation of application No. 17/508,006, filed on Oct. 22, 2021, now Pat. No. 11,785,070.

(51) Int. Cl.
| G06F 15/16 | (2006.01) |
| G06F 3/0482 | (2013.01) |
| G06F 3/04842 | (2022.01) |
| H04L 67/01 | (2022.01) |
| H04L 67/02 | (2022.05) |
| H04L 67/51 | (2022.01) |

(52) U.S. Cl.
CPC ............ *H04L 67/01* (2022.05); *G06F 3/0482* (2013.01); *G06F 3/04842* (2013.01); *H04L 67/02* (2013.01); *H04L 67/51* (2022.05)

(58) Field of Classification Search
CPC ........ G06F 9/452; G06F 3/0484; G06F 9/451; G06F 2209/545; G06F 8/38; G06F 3/04817; G06F 3/0482; G06F 3/04842; H04L 67/51; H04L 67/02; H04L 63/01
See application file for complete search history.

(56) References Cited

U.S. PATENT DOCUMENTS

| 2009/0150831 A1* | 6/2009 | Young ................. G16H 40/40 715/845 |
| 2011/0072424 A1* | 3/2011 | Choi .......................... G06F 8/61 718/1 |

(Continued)

*Primary Examiner* — Dustin Nguyen
*Assistant Examiner* — Hao H Nguyen
(74) *Attorney, Agent, or Firm* — Erise IP, P.A.

(57) ABSTRACT

Media, methods, and systems are disclosed for providing one or more cloud-based, platform agnostic cloud applications and displaying the one or more cloud-based application in the display of a client device. The cloud applications may be displayed on a client device after, receiving, at a server side, a first request to access a cloud application, wherein the cloud application comprises a feature providing the functionality of the cloud application. Responsive to the request, fetching, from a storage, a first data source comprising one or more fields associated with the feature of the cloud applications. Responsive to the fetching, transmitting the first data source to a client side, wherein the client side is configured for storing a second data source comprising one or more fields providing a user interface of the cloud application. Responsive to the transmitting, displaying a user interface of the one or more cloud applications.

20 Claims, 5 Drawing Sheets

(56) References Cited

U.S. PATENT DOCUMENTS

| | | | |
|---|---|---|---|
| 2012/0066670 A1* | 3/2012 | Mccarthy | G06F 8/61 717/169 |
| 2012/0185874 A1* | 7/2012 | Cookson | H04L 67/10 719/313 |
| 2012/0222110 A1* | 8/2012 | Huang | H04L 63/1408 726/22 |
| 2013/0067531 A1* | 3/2013 | Morris | G06F 21/54 726/16 |
| 2013/0227085 A1* | 8/2013 | Choi | H04L 67/1095 709/219 |
| 2013/0254855 A1* | 9/2013 | Walters | G06F 21/31 726/5 |
| 2013/0346268 A1* | 12/2013 | Pereira | G06F 8/65 709/224 |
| 2014/0101426 A1* | 4/2014 | Senthurpandi | G06F 21/575 713/1 |
| 2014/0149892 A1* | 5/2014 | Algreatly | G06F 16/955 715/760 |
| 2015/0033078 A1* | 1/2015 | Wintergerst | G06F 11/3664 714/38.1 |
| 2015/0095497 A1* | 4/2015 | Caputo | H04L 67/51 709/226 |
| 2015/0160807 A1* | 6/2015 | Vakharia | G06F 16/29 715/834 |
| 2015/0188990 A1* | 7/2015 | Kacmarcik | H04L 67/51 709/203 |
| 2015/0347542 A1* | 12/2015 | Sullivan | G06F 9/5072 707/602 |
| 2016/0034253 A1* | 2/2016 | Bang | H04M 1/724 715/728 |
| 2016/0085533 A1* | 3/2016 | Jayanti Venkata | H04L 41/28 717/175 |
| 2016/0189315 A1* | 6/2016 | Anania | G06Q 30/0239 705/319 |
| 2016/0330280 A1* | 11/2016 | Blumenthal-Barby | G06F 16/24534 |
| 2016/0364695 A1* | 12/2016 | Patterson | G06Q 10/1093 |
| 2017/0054861 A1* | 2/2017 | Dejoras | G06F 3/1271 |
| 2017/0060608 A1* | 3/2017 | Raghunathan | G06F 11/30 |
| 2017/0180570 A1* | 6/2017 | Hirasawa | H04N 1/00474 |
| 2017/0185441 A1* | 6/2017 | Hay | G06F 9/455 |
| 2017/0346862 A1* | 11/2017 | Hanhirova | H04L 63/08 |
| 2018/0006883 A1* | 1/2018 | Melliere | H04L 67/34 |
| 2018/0063360 A1* | 3/2018 | Ida | G06F 3/1287 |
| 2018/0077244 A1* | 3/2018 | Thakkar | H04L 67/14 |
| 2018/0121030 A1* | 5/2018 | Hu | H04L 67/34 |
| 2018/0341762 A1* | 11/2018 | Gravenites | H04L 9/088 |
| 2019/0129730 A1* | 5/2019 | Chen | H04L 67/53 |
| 2019/0294613 A1* | 9/2019 | Sullivan | H04L 41/0806 |
| 2019/0317783 A1* | 10/2019 | Lemay | G06F 9/45533 |
| 2019/0370091 A1* | 12/2019 | Ozer | G06F 9/451 |
| 2020/0125376 A1* | 4/2020 | Kashyap | G06F 9/543 |
| 2021/0232409 A1* | 7/2021 | Vetter | G06F 9/451 |
| 2022/0182447 A1* | 6/2022 | Ding | G06N 20/00 |
| 2024/0012677 A1* | 1/2024 | Boderck | G06F 9/4806 |

* cited by examiner

CONNECTED CLOUD APPLICATIONS

RELATED APPLICATIONS

This patent application is a continuation application claiming priority benefit, with regard to all common subject matter, of U.S. patent application Ser. No. 17/508,006, filed Oct. 22, 2021, and entitled "CONNECTED CLOUD APPLICATIONS." The above-referenced patent application is hereby incorporated by reference in its entirety into the present application.

TECHNICAL FIELD

Embodiments of the invention generally relate to platform agnostic cloud applications. More specifically, embodiments of the invention relate to connected logical applications that can be coded once and viewed and interacted with on a variety of platforms, hardware, and operating systems without re-writing the code of the logical applications.

Typically, mobile applications, web applications, and other software or services running on internet-enabled devices must be written for operating on a particular platform, operating system, or hardware. For example, mobile applications are typically written to run natively on one specific platform, such as an Apple iPhone or an Android phone. Accordingly, developers when creating applications must write a version of the applications for each platform the application will be available on. Accordingly, there is a significant time and cost investment for developers when creating mobile applications for multiple platforms.

Furthermore, applications that are platform specific present numerous challenges and shortcomings for end-users using the applications. For example, to use an application on a smart phone the end-user must first download the application to the memory of the smart phone. Over time, continually downloading applications can use up a significant amount of the limited physical storage of the smart phone. Furthermore, for many applications, an end-user is required to create a user account to even access and use the application. Similar to multiple applications taking up storage, requiring end-users to remember multiple usernames and passwords can be cumbersome for end-users.

Accordingly, what is needed is a platform agnostic application, that may be written or coded one time for running on multiple platforms, hardware, or operating systems. Furthermore, what is also needed is platform agnostic applications that provide end-users with granularity in selecting the functionality of the applications as well as connecting with other applications.

SUMMARY

Embodiments of the invention address the above-identified need by providing platform agnostic logical applications. In particular, in a first embodiment, the invention includes one or more non-transitory computer-readable media storing computer-executable instructions that, when executed by a processor, perform a method for selecting one or more cloud-based, platform agnostic cloud applications and displaying the one or more cloud-based application in the display of a client device, the method comprising: receiving, at a server side, a request to access a cloud application, wherein the cloud application comprises a feature providing the functionality of the cloud application; fetching, from a storage, a first data source comprising one or more fields associated with the feature of the cloud applications; transmitting the first data source to a client side, wherein the client side is configured for storing a second data source comprising one or more fields providing a user interface of the cloud application; displaying, on a display of a client device, a user interface of the one or more cloud applications; and providing, through the user interface, the feature of the cloud application to a user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
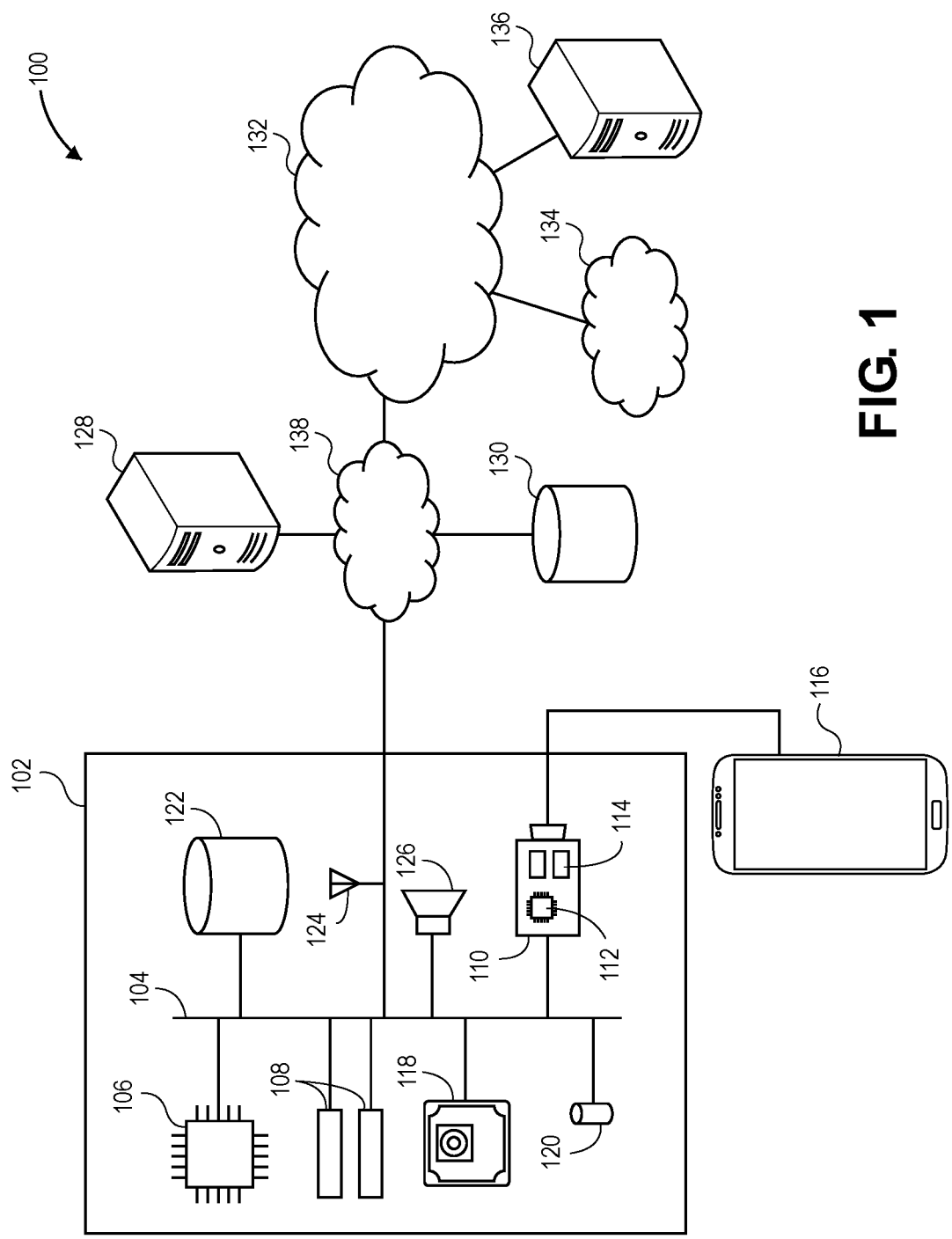
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Broadly, embodiments of the present invention are directed to cloud-based, non-platform, hardware, or operating system specific applications, referred to herein as logical applications. Logical applications, as contemplated herein, may exist in a cloud network, with information associated with the logical application, including for example all interfaces, logic, functionality, and data of the application, also existing in the cloud network. Accordingly, the logical applications of the present invention are distinct, separate, and independent from the hardware and/or platform. Furthermore, through such platform agnosticism, logical applications may run as if native on any platform, hardware, or operating system, including those that have yet to be discovered. Conversely, standard or "binary" applications are applications that are written and coded to run natively on only one particular platform or hardware.

Additionally, as described in greater detail below, logical applications may comprise one or more features, defining the functionality of the logical applications that may be self-contained within the logical application, allowing users to selectively activate features during use of the logical application. Even further, because the logical applications exist in a cloud network, logical applications may further connect and interact with other logical applications through the cloud network and across any and all platforms, hardware, or operating systems. Through such a connection, users may view and interact with other connected logical applications while still running an original logical application.

Operational Environment for Embodiments of the Invention

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 124 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
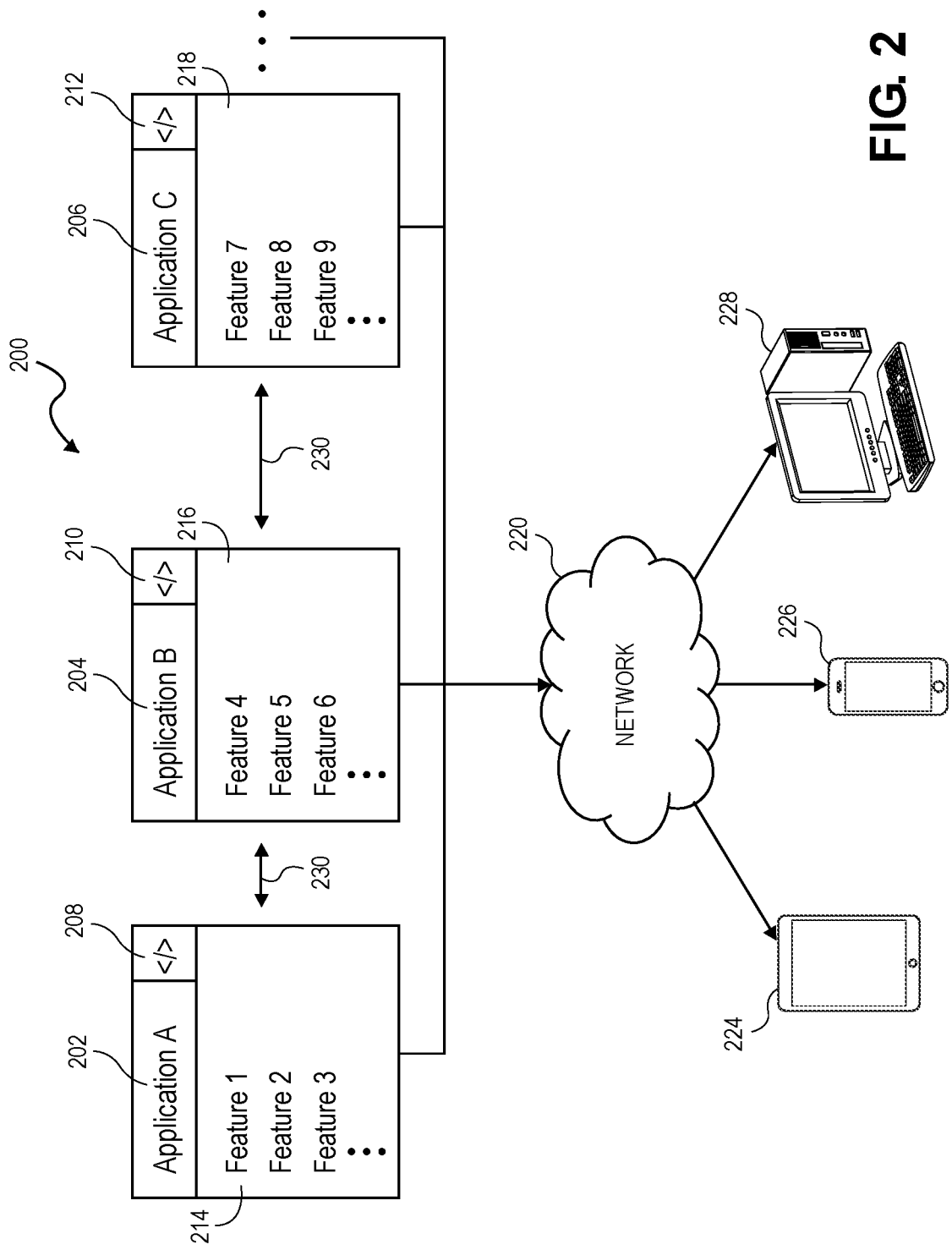
FIG. 2 depicts a system diagram illustrating an example system architecture for certain embodiments.

Turning now to FIG. 2, an exemplary system consistent with the teachings is depicted and referred to generally by reference numeral 200. As depicted in the FIG. 2, system 200 may comprise at least one logical application, including for example logical application A 202, logical application B 204, and logical application C 206. However, it will be appreciated that system 200 may comprise any number of logical applications and is not intended to be limited to the three logical applications of the illustrated embodiments. As used herein, "logical application" refers to an application or software which is coded or otherwise written to be platform, hardware, or operating system agnostic, or in other words, may run as if native on any platform. In a standard physical or "binary" application, the binary application is coded or otherwise written for a specific operating system, service, or platform. For example, a binary application for video streaming may be available on both an iPhone and Android Phone must be written or coded twice, once for running on iOS and once for running on the Android operating system. Conversely, a logical application is written or coded as agnostic towards operating systems or platforms, and instead, may be written once. Non-limiting examples of logical applications include, but are not limited to, music streaming applications, video streaming applications, podcast applications, or any other application comprising an application programming interface (API).

As further illustrated in FIG. 2, each of logical application A 202, logical application B 204, and logical application C 206 may comprise instructions or information indicative of a particular logical application. For example, instructions 208, 210, and 212 may correspond with logical application A 202, logical application B 204, and logical application C 206, respectively. In some embodiments, instructions 208, 210, and 212 may comprise information associated with each of the logical applications, including but not limited to the code and/or instructions of each logical application. For example, instructions 208, 210, and 212 may include, but are not limited to: the features that are included with the logical application, which features are currently turned on for a particular logical application, which features are currently disabled, the aesthetic look and feel of the logical application (such as graphics, text, sound effects, etc.), the name of the logical application, a listing of the logical applications administrators, the name and number of other logical applications that are connected to the logical application, among other information. It will be appreciated however, that instructions 208, 210, and 212 may comprise any additional information coded, written, uploaded, or is otherwise associated with the logical application.

Each of logical application A 202, logical application B 204, and logical application C 206 may further comprise one or more features, features 214, 216, and 218 respectively, defining the functionality of the logical application. Features, as used herein, refer to the functions, capabilities, and abilities of the logical applications. For example, an exemplary embodiment of a logical application used for scheduling events may comprise an "Events Feature", wherein administrators of the logical application may create events within the logical application, while end-users, in the logical application, may view the events and indicate whether or not they will attend the created events. By way of another non-limiting example, an exemplary embodiment of a logical application used for streaming videos may comprise a "Video Feature", wherein administrators of the logical application may upload videos that end-users may later view within the logical application. It will be appreciated that the exemplary examples of the features described herein are not intended to be limiting examples, and rather, the features may comprise a spectrum of functions, capabilities, and abilities of the logical applications. In some embodiments, a logical application may comprise a plurality of features, providing the logical applications with a variety of functions. For example, a logical application may comprise both an "Events Feature" for scheduling events and a "Video Feature" for uploading videos of the events that were scheduled. It will be appreciated that a logical application may comprise any combination of a plurality of features. Non-limiting examples of other features that the logical applications may comprise include, but are not limited to: a messaging feature, a video playing feature, an audio playing feature, a live-streaming video feature, a web-page feature, a health and fitness feature, an event scheduling feature, a local businesses feature, and an interactive media feature.

Continuing with FIG. 2, in some embodiments, logical application A 202, logical application B 204, and logical application C 206 may be configured for connection to and/or communication with a network 220. In some embodiments, network 220 may be a cloud network, including for example network 126 as described above with respect to FIG. 1. Through the connection via network 220, logical application A 202, logical application B 204, and logical application C 206 may communicate with and connect to one or more client devices, including for example client device 224, client device 226, and/or client device 228. Through such connection via network 220, and as described in greater detail below, logical application A 202, logical application B 204, and logical application C 206 may be written as being agnostic with respect to a platform or an operating system. Therefore, client devices 224, 226, 228 may be any currently known or yet to be discovered hardware or operating system. By way of non-limiting example, client device 224 may be an Apple iPhone or an Android smartphone; client device 226 may be a tablet, such as an Apple iPad or a Microsoft Surface; and client device 226 may be a laptop or desktop computer, such as an Apple iMac or a Dell desktop. Accordingly, logical applications may run on any hardware or operating system capable of connecting to network 220.

In addition to connecting with network 220 for communicating with client devices 224, 226, and/or 228, each of logical applications 202, 204, and 206 may further connect and communicate with each other and even further, with other logical application through application connection 230. As described in greater detail below, through application connection 230, end-users may connect with other logical applications, allowing end-users to view the content of other connected logical applications. Furthermore, in some embodiments and as described in greater detail below, a user viewing and interacting with a first logical application may open a connected logical application and view and interact with a connected logical application while still running the first logical application. Accordingly, while each of logical applications 202, 204, and 206 may be in communicative connection while simultaneously being in communicative connection with client devices 224, 226, and 228 respectively. For example, a user initially viewing and interacting with logical application A 202 on client device 224 may wish to view logical application B 204, which is connected. Without exiting from logical application A 202, the user may input instructions for loading logical application B 204 while still in logical application A 202. Following the instructions from the user, logical application B 204 may then be run on client device 224.

Figure 3:
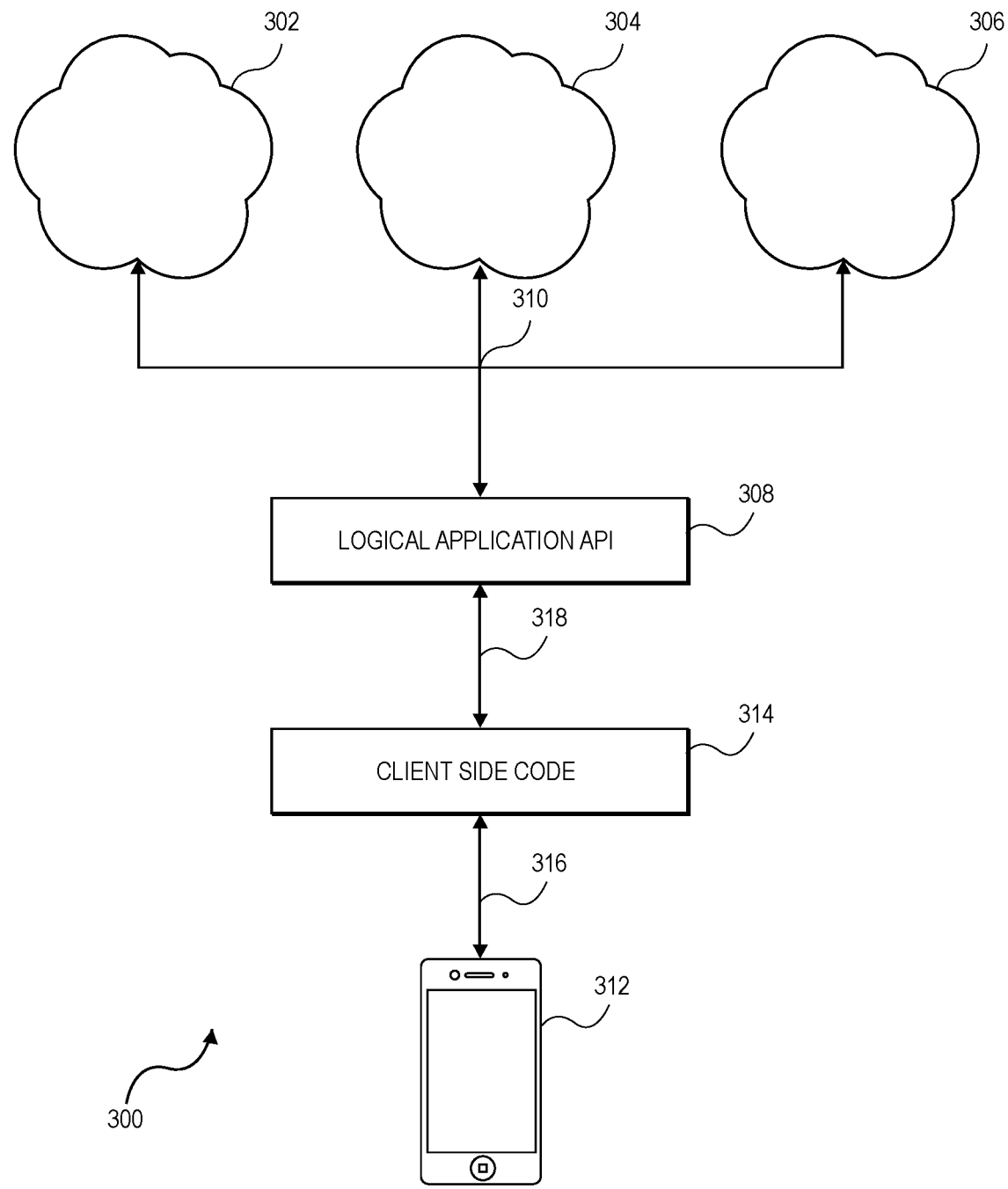
FIG. 3 depicts a system diagram illustrating an example system architecture for certain embodiments.

Turning now to FIG. 3, an example system architecture of the present teachings is depicted and referred to with reference numeral 300. As depicted in FIG. 3, in some embodiments, data sources comprising one or more fields, including metadata, or other information corresponding to a logical application may be stored in one or more cloud databases, including for example cloud databases 302, 304, and 306. However, it will be appreciated that any number of cloud databases may be utilized, and the number of cloud databases is not a limiting feature of the invention. Accordingly, in some embodiments, logical applications may be stored in a cloud storage rather than in a physical server, memory, or other physical database. Information stored in cloud databases 302, 304, and/or 306 can include the features of each application, including for example the features 214, 216, and 218 and instructions 208, 210, and 212 as described above with respect to FIG. 2. As further illustrated in FIG. 3, cloud databases 302, 304, and 306 may be in communication with a logical application API 308. Logical application API 308 may be a service side API for executing the code or instructions for the logical applications. Logical application API 308 and cloud databases 302, 304, and 306 may be communicatively coupled through connection 310. Connection 310 may be any known or yet to be discovered method of indirect or wireless connection, including but not limited to WiFi, Bluetooth, cellular network, or other indirect internet connection, including for example network 126 as described above with respect to FIG. 1.

In some embodiments, logical application API 308 may run on a cloud-based server or other server in communication with cloud databases 302, 304, and 306. By way of non-limiting example, the cloud-based server may be a public cloud server, a private cloud server, or a dedicated cloud server. However, it will be appreciated that logical application API may run on any cloud-based server or storage database, currently known or yet to be discovered. Accordingly, through connection 310, logical application API 308 may interact directly with cloud databases 302, 304, and/or 306. Furthermore, in some embodiments, logical application API 308 may run a standardized, or otherwise non-platform specific. Accordingly, the information stored on cloud databases 302, 304, and/or 306 may be structured in the standardized language of the logical application API 308, allowing logical applications to be used on any client device, hardware, platform, or operating system.

In some embodiments, end users may access the logical applications stored on cloud databases 302, 304, and/or 306 through a client device 312. Client device 312 may be any of the client devices described above with respect to FIG. 1, including for example a smartphone or tablet. In some embodiments, the client device 312 may further connect with or otherwise communicate with a client-side code 314 through connection 316 for communicating with logical application API 308, and through such communication, may implement the features of the logical application on the client device 312. In some embodiments, client-side code 314 may be run on client device 312 and stored in a memory housed in client device 312 and acted upon by a processor. In further embodiments, client-side code 314 may be run on a cloud server or other cloud storage database, including but not limited to a public cloud server, a private cloud server, or a dedicated cloud server. Accordingly, client device 312 may be either connect with client-side code 314 through either a direct connection or alternatively through an indirect connection.

Implementation of the features on client device 312 may be achieved through cooperation between client-side code 314 and logical application API 308. Client-side code 314 and logical application API may be connected through connection 318, which may be a cloud connection or other form of indirect connection including for example, WiFi, Bluetooth, or other wireless connections. For example, in some embodiments, client-side code 314 may comprise one or more data sources including the images, .html, css, javascript, local relational database (SQLite), or other data files that may provide the technical aspects of the user interface of a logical application. From a webview, or other equivalent system component of the operating system, client device 312 may call out to out to client-side code 314 for implementing the user interface of a logical application selected by the user to run on client device 312. Accordingly, through the calling to and implementation of data from client-side code 314, the look and feel of the logical application will be the same on each client device 312, even on client devices running different operating systems. For example, the look and feel of a video streaming logical application may look and operate the same on an Android smartphone as an Apple iPhone.

In some embodiments, responsive to a request or prompt from client device 312, client-side code 314 may call out to logical application API 308 for the standardized code for a selected logical application. Following the initiated communication from client-side code 314, logical application API 308 may transmit the standardized code associated with the selected logical application to client-side code 314 to provide the user interface of the logical application. Following the transmitting of the standardized code from logical application API 308 and the user interface from client-side code 314, the logical application may be displayed on client device 312. Accordingly, in some embodiments, a user may view and interact with a logical application without downloading or storing the logical application to the physical memory of client device 312.

Additionally, through the communicative connection between client-side code 314 and logical application API 308, a user may also interact with logical applications in other ways than just running the logical application on client device 312. For example, in some embodiments, a user may input instructions through client device 312 that may be transmitted to logical application API 308 to make changes to features or instructions of the logical application, including for example adding or removing features. Further, through client device 312, a user may create and/or load new content to the logical application, including for example uploading videos or music to the logical application. Even further, through client device 312 a user may make changes to the connection between the selected logical application and other logical applications, including for example, adding, or removing connected logical applications.

Furthermore, in some embodiments, because logical applications are stored in cloud databases 302, 304, and/or 306 and are implemented through a cooperative combination of logical application API 308 and client-side code 314, users may only need credentials or authority to access logical application API 308. For example, in traditional binary applications, users oftentimes are required to have usernames or log-in credentials for each individual binary application. In logical applications however, a user may not be required to log in to each logical application, and instead, may only need access to logical application API 308. For example, after selecting a music streaming logical application to run on client device 312 a user may wish to switch to a video streaming logical application. As described in greater detail below, logical applications may be connected with one another and while in a first logical application, a user may select a second logical application to run on client device 312 without exiting the first logical application. When selecting a second logical application to run, a user does not need to enter separate log-in credentials for the second logical application, and instead, may select, open, and interact with the second logical application unimpeded.

Figure 4A:
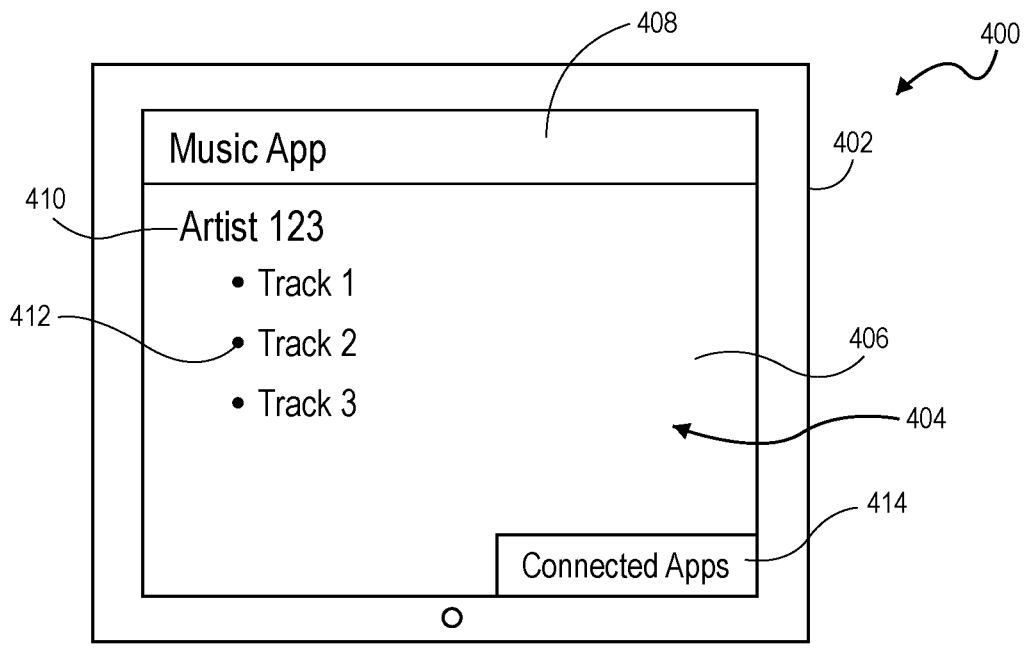
FIG. 4A depicts a graphical user interface of a logical application in accordance with certain embodiments.
Figure 4B:
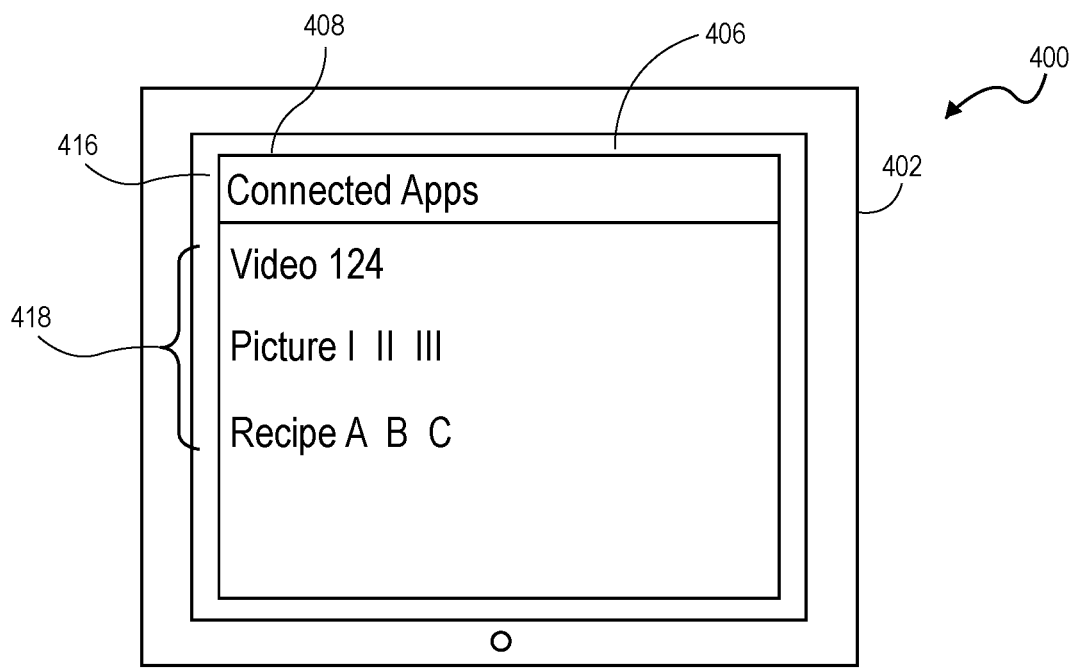
FIG. 4B depicts the graphical user interface of the logical application illustrated in FIG. 4A after a connected applications pane is generated and displayed in the graphical user interface.
Figure 4C:
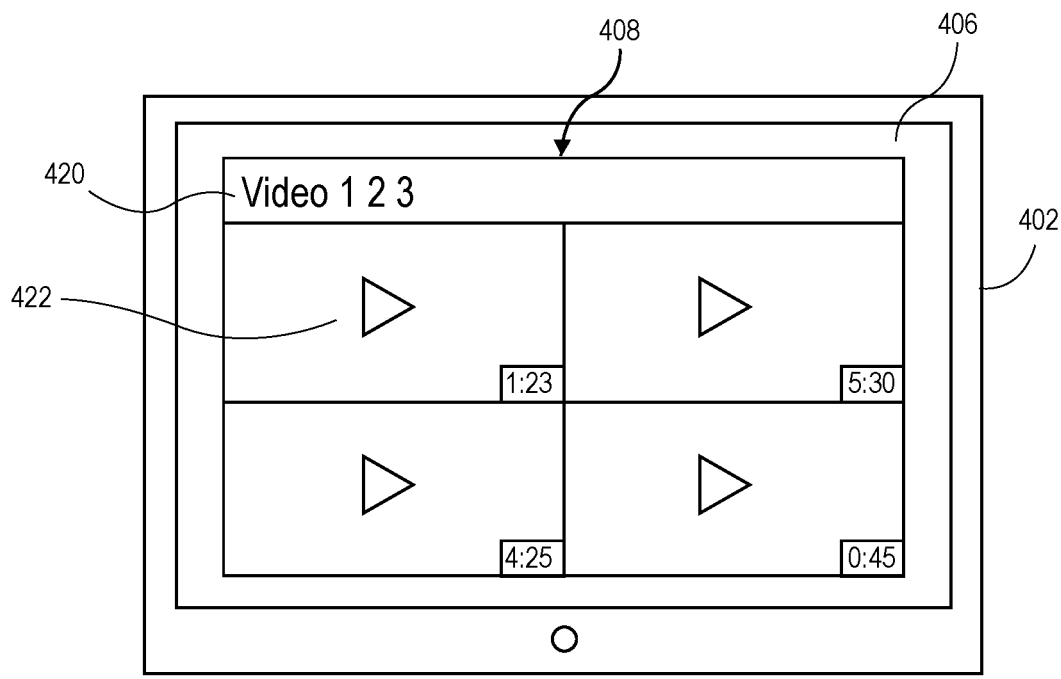
FIG. 4C depicts the graphical user interface of the logical application illustrated in FIG. 4B after a connected application is selected and running in the graphical user interface.

Turning now to FIGS. 4A-C, an exemplary embodiment of the user interface of a client device running a logical application is depicted and referred to with reference numeral 400. As illustrated, a client device 402 may comprise a display 404 for displaying a graphical user interface (GUI) 406 for loading and running logical applications 408. Display 404 may be any known or yet to be discovered screen, including touchscreens, or other output for a client device 402. Logical applications 408 may, for example, be logical application A 202, logical application B 204, or logical application C 206 as described above. As described above, logical applications may be run on any hardware or operating system, so client device 402 may be any of the described client devise or operating described herein or otherwise may be developed in the future, including but not limited to smartphones, tablets, laptops, and desktop computers.

As further illustrated in FIG. 4A, in some embodiments, GUI 406 may display to a user the look and feel (i.e., the user interface) of a logical application 408 running on client device 402. For example, GUI 406 may load the graphics, images, texts, sounds, or other aesthetic components of the logical application. Furthermore, GUI 406 may also display features of the logical application 408, providing to the user the functionality of the logical application 408. Logical application 408 may comprise various panes, text boxes, or other components allowing a user to navigate and interact with the logical application 408. For example, the exemplary logical application 408 may be a music streaming application, comprising a music streaming feature 410, wherein catalogs of musical artists and songs may be available for playing music through logical application 408. Through GUI 406, a user may navigate through a plurality of musical artists until reaching a particular artist that the user selects. Following selection of an artist a user may then navigate through songs or track listings 412 associated with the artist. A user may then select a song or track for playing music.

As further illustrated, GUI 406 may further comprise a connected applications tab 414, icon, or another selectable item. As described above, logical application 408 may be connected with one or more other logical applications. Accordingly, in some embodiments, connected applications tab 414 may be selected by a user, and responsive to the selection, provide to the user a listing of one or more connected logical applications connected with logical application 408. By way of non-limiting example, connected applications tab 414 may be a clickable tab located at a bottom corner of GUI 406 that a user may click on and be provided with a listing of connected logical applications.

Turning now to FIG. 4B, one or more connected logical applications may be displayed to a user through GUI 406. For example, in some embodiments, following the clicking or selecting of connected applications tab 414, a connection applications pane 416 may be generated, superimposed, or otherwise displayed within GUI 406. In some embodiments, connected application pane 416 may be generated and displayed in GUI 406 while logical application 408 is still running and visible behind connected applications pane 416. Accordingly, a user may view a listing of other logical applications connected to logical application 408 without navigating away, exiting, or otherwise leaving the GUI 406 of logical application 408. As further depicted, connected applications pane 416 may comprise a listing 418 of one or more connected logical applications connected to logical application 408. By way of non-limiting example, connected logical applications may be provided to the user through listing 418. For example, listing 418 may comprise a list of a video streaming logical application, a picture sharing logical application, and a recipe logical application connected to logical application 408. In further embodiments, logical application 408 may be connected with other web applications, mobile applications, or other software implementations that are not other logical applications.

In some embodiments, logical applications may be connected together in a number of pre-determined ways. For example, in some embodiments, an administrator of logical application 408 may include instructions for connecting logical application 408 with the one or more logical applications included within listing 418. For example, an administrator may be the administrator of a plurality of logical applications, and may, wish to keep the logical applications connected. Accordingly, such connected logical applications may be displayed within listing 418 whenever one of the connected applications is displayed within GUI 406. Furthermore, logical applications may further be connected through other methods of connection, including but not limited to connected logical applications by developers or publishers. For example, a company, such as Microsoft or Apple, may wish to connect all their logical applications together, including all Microsoft applications in a listing 418. Furthermore, in some embodiments, logical applications may be connected together for a set or predetermined length of time and following the passage of the predetermined length of time, may become unconnected. For example, the developer of a new logical application may wish to promote their logical application to potential new users. The developer may make their logical application a "sponsored" application, and the sponsored logical application may appear on one or more other logical application listings 418 for a set length of time.

In further embodiments, logical applications may be connected through instructions or commands set by an end-user of logical application 408. For example, an end-user may use a plurality of logical applications, and may wish to connect their most used logical applications for convenience in switching to a new logical application. Accordingly, each logical application may further comprise a clickable button or other method of selecting a logical application to be included in a list of connected applications. Continuing with the exemplary embodiment described above, an end-user may wish to manually connect a video streaming logical application, a picture sharing logical application, and a recipe logical application with the music streaming logical application 408. Accordingly, whenever the end-user is viewing and interacting with one of the logical applications within listing 418, the remaining logical applications of listing 418 may be accessible through connected applications tab 414.

In further embodiments, logical applications may have connection relationships with connected logical applications. For example, in some embodiments, the connected logical applications may have a mutual relationship, wherein each of the connected applications appears in a listing 418 for each application. In further embodiments, logical applications may have one-sided relationships, wherein a first logical application may appear in a listing 418 of the second logical application, but the second logical application may not appear in a listing 418 of the first logical application. Even further, logical applications may be connected with a plurality of other logical applications, and each of the logical applications may have different connection relationships amongst the plurality of logical applications. For example, a logical application may have a mixture of mutual relationships with a plurality of connected logical applications and one-sided relationships with another plurality of connected logical applications. Further, in some embodiments, the relationships between connected logical applications may evolve over-time, or in other words, the relationships may be dynamic rather than static. For example, two logical applications may have a one-sided relationship for a given length of time, which after expiration of a length or time or upon instructions from a user, may change to a mutual relationship.

In some embodiments, a machine learning algorithm may be implemented and taught for providing recommendations to a user for connected logical applications. For example, a machine learning algorithm may be trained to learn habits and trends for individual users and provide recommendations to those individual users and recommend connections between logical applications. For example, a user running a music streaming application may play songs belonging to a particular music genre or an artist, including by way of non-limiting example, "The Beatles." Through the machine learning algorithm tracking of users' activity, recommendations of logical applications may be provided to the user. For example, a user listening to The Beatles through a music streaming application may be provided with a recommendation to connect the music streaming application with a Beatles fan group application.

In further embodiments, a logical application may be included in a plurality of listings 418. For example, a logical application may be included in a first listing of connected applications established by an administrator or developer. The same logical application may also be included in a second listing of connected applications established by an end-user, including for example, a listing of favorited logical applications. Furthermore, the same logical application may so be included in a listing suggested by a machine learning algorithm. Even further, the same logical application may also be included in a listing created by the developer of the logical application. In even further embodiments, listing 418 may comprise a listing or index of a plurality of listings 418, rather than logical applications, that a user may navigate and select. Upon the selection of a specific listing 418, an index or lineup of logical applications associated with that particular listing 418 may generate and be displayed in GUI 406. For example, a listing 418 may comprise a listing.

In even further embodiments, recommendations of logical embodiments may be provided to a user. In some embodiments, through location services, such as geolocation provided on a user's client device, recommendations of logical applications may be provided to a user based on the user's location. For example, popular logical applications in a particular area may be recommended to a user. Furthermore, a user may grant to one or more logical applications access to the user's client device, including friends or contacts stored on the client device. Recommendations may be provided to the user based at least in part on the logical applications used the user's friends or contacts.

In some embodiments, following the generation and display of connected applications pane 416, a user may select one of the connected logical applications from listing 418 for displaying in GUI 406. FIG. 4C depicts an exemplary embodiment of a connected logical application selected from listing 418 displayed in GUI 406. For example, a user may select a video streaming logical application 420 from listing 418 and following selection, video streaming logical application 420 may be displayed in GUI 406, allowing the user to watch videos 422 from client device 402. Furthermore, in some embodiments, video streaming logical application 420 may be overlaid or otherwise superimposed over music streaming logical application 408. Accordingly, in some embodiments, a user may view and interact with a connected logical application displayed in GUI 406 while the originally viewed logical application is still running in the background of GUI 406. In other words, a user is not required to exit out of a first logical application to view and interact with a second logical application. In some embodiments, connected logical applications that are selected and displayed in GUI 406 may comprise a connection tab, similar to connected applications tab 414. For example, in the exemplary embodiments, video streaming logical application 420 may further comprise a connection tab, allowing a user to see other logical applications connected with video streaming logical application 420. In some embodiments, video streaming logical application 420 (or another connected logical application) may be connected to one or more different logical applications than music logical application 408. Through a connection tab associated with video streaming logical application 420, a user may generate a new listing, such as listing 418 from FIG. 4B.

Figure 5:
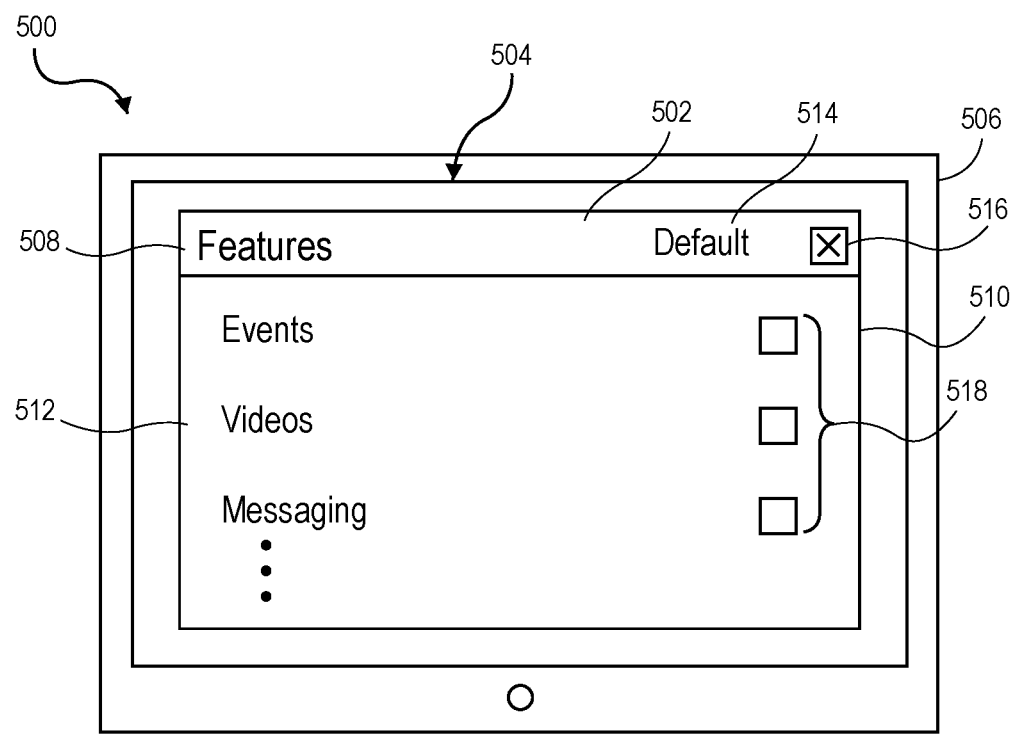
FIG. 5 depicts a graphical user interface of a logical application in accordance with certain embodiments.

Turning now to FIG. 5, an exemplary user interface of a logical application is depicted and referred to with reference numeral 500. The logical application 502 depicted in FIG. 5 may be any of logical application A 202, logical application B 204, or logical application C 206 as described above. As also described above, logical applications may comprise one or more features, comprising the functions and capabilities of the logical application. In some embodiments, a logical application 502 may be viewed and interacted with via a GUI 504 displayed on a display of a client device 506, including for example display 404 as referenced above with respect to FIG. 4A-C. As further depicted in some embodiments, one or more features 508 may be accessed via a features pane 510. In some embodiments, features pane 510 may be generated and populated in GUI 504. For example, features pane 510 may be generated following a clickable icon, swiping, or other methods of generating a pane in a GUI.

In some embodiments, a logical application may comprise more than one feature 508, with each of the features 508 comprising a different function of logical application 502. Accordingly, logical application 502 may comprise a feature list 512 comprising a listing or index of features 508 included with logical application 502. By way of non-limiting example, feature list 512 may comprise an events feature, a videos feature, and a messaging feature, allowing administrators, developers, or other back-end users to select the features 508 for the logical application. However, it will be appreciated that a logical application may comprise any number of features, from a single feature to any number of conceivable features.

Furthermore, an administrator or user may establish one or more features as "default", wherein an administrator determines that some features are important, critical, or otherwise required for running the logical application.

Accordingly, in some embodiments, logical application 502 may comprise one or more default features, which may be set to an active state when an end-user selects the logical application to run on client device 506. In some embodiments, a graphic, such as a defaults graphic 514 may be provided through GUI 504. An accompanying toggle or other indicator, such as default toggle 516 may further be provided through GUI 504, default toggle 516 may comprise a selectable check or other indicator, providing a visual to an end-user whether the default features 508 are in an active or inactive state. For example, default toggle 516 may be a clickable icon, a toggle switch, or any other tool for selectively changing the status of the default features 508. Following manipulation of default toggle 516, a visual indication may be provided to the user, indicating that default toggle 516 is in an active state, and that the default features 508 are activated. For example, the visual indication may be a check-mark or an "x" populating default toggle 516. Accordingly, the absence of a visual indication on default toggle 516 may alert the user that the default features 512 are not activated.

Furthermore, in some embodiments, features 508 may be selectively toggled on or off, providing to a user granularity in selecting which features 508 may be active during a particular time. For example, in some embodiments, each feature 508 may comprise its own feature toggle 518 providing to a user granularity in selecting which features 508 are active and which features 508 are inactive during a particular session of using logical application 502. For example, for a variety of reasons, a user may not wish to have one or more of the default features 508 activated for a particular session. Accordingly, rather than selecting the default toggle 516 to activate each default feature 508, a user may selectively choose one or more features 508 to activate through the feature toggle 518. For example, logical application 502 may comprise features 508 for scheduling events, uploading videos, and for instant messaging, by way of non-limiting example. A user may wish to only have the feature for scheduling events and instant messaging active, while the feature for uploading videos may remain inactive. Accordingly, a user may toggle the feature toggle 518 for the feature for scheduling events and instant messaging, thereby activating the features, while not toggling the feature toggle 518 for uploading videos. Furthermore, a user may wish to toggle one or more of the features 508 during a session, toggling a feature 508 from active to inactive. Accordingly, during a particular session of using logical application 502, a user is not restricted to the features 508 that are active when the session begins.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Although the invention has been described with reference to the embodiments illustrated in the attached drawing figures, it is noted that equivalents may be employed, and substitutions made herein, without departing from the scope of the invention as recited in the claims.

Having thus described various embodiments of the disclosure, what is claimed as new and desired to be protected by Letters Patent includes the following:

1. One or more non-transitory computer-readable media comprising computer-executable instructions that, when executed by at least one processor, perform a method for selecting a plurality of platform-agnostic logical applications and displaying the plurality of platform-agnostic logical applications in a display of a client device, comprising:
   receiving, at a server side, a first request from a client side to access a first logical application;
   fetching a first set of standardized instructions associated with the first logical application, wherein the first set of standardized instructions comprises a first functionality of the first logical application;
   transmitting the first set of standardized instructions to the client side;
   accessing, on the client side, a first set of client-side code for rendering a first user interface on the client device, the first set of client-side code stored in memory of the client device;
   providing, based on the first set of client-side code and the first set of standardized instructions and through the first user interface associated with the first logical application, the first functionality to a user associated with the client device;
   receiving, at the server side, a second request from the first logical application to access a second logical application;
   fetching a second set of standardized instructions associated with the second logical application, wherein the second set of standardized instructions comprises:
   a second functionality of the second logical application;
   transmitting the second set of standardized instructions to the first logical application;
   accessing, on the client side, a second set of client-side code for rendering a second user interface on the client device, the second set of client-side code stored in the memory of the client device; and
   providing, based on the second set of client-side code and the second set of standardized instructions and through the second user interface associated with the second logical application, the second functionality to the user associated with the client device,
   wherein the first logical application and the second logical application are cloud-based applications.

2. The one or more non-transitory computer-readable media of claim 1, wherein providing the second functionality occurs contemporaneously with providing the first functionality.

3. The one or more non-transitory computer-readable media of claim 1, wherein the first logical application and the second logical application are stored in one or more public cloud databases.

4. The one or more non-transitory computer-readable media of claim 1, wherein the method further comprises:
   causing display of, through the second user interface, a set of content from the first logical application.

5. The one or more non-transitory computer-readable media of claim 1, wherein the method further comprises:
   running the second logical application from within the first logical application.

6. The one or more non-transitory computer-readable media of claim 1, wherein the second functionality is distinct from the first functionality.

7. The one or more non-transitory computer-readable media of claim 1, wherein providing the second functionality is determined by statuses of one or more indicators associated with the second functionality, wherein the statuses being in an active state indicate that the second functionality is to be provided.

8. A method of selecting a plurality of platform-agnostic logical applications and displaying the plurality of platform-agnostic logical applications in a display of a client device, the method comprising:
receiving, at a server side, a first request from a client side to access a first logical application;
fetching a first set of standardized instructions associated with the first logical application, wherein the first set of standardized instructions comprises a first functionality of the first logical application;
transmitting the first set of standardized instructions to the client side;
accessing a first set of client-side code for rendering a first user interface on the client device, the first set of client-side code stored in memory of the client device;
providing, based on the first set of client-side code and the first set of standardized instructions and through the first user interface associated with the first logical application, the first functionality to a user associated with the client device;
receiving, at the server side, a second request from the first logical application to access a second logical application;
fetching a second set of standardized instructions associated with the second logical application, wherein the second set of standardized instructions comprises:
a second functionality of the second logical application;
transmitting the second set of standardized instructions to the first logical application;
accessing a second set of client-side code for rendering a second user interface on the client device, the second set of client-side code stored in the memory of the client device;
providing, based on the second set of client-side code and the second set of standardized instructions and through the second user interface associated with the second logical application, the second functionality to the user associated with the client device; and
causing display of, through the second user interface, a set of content from the first logical application,
wherein the first logical application and the second logical application are cloud-based applications.

9. The method of claim 8 further comprising:
causing display of, in the first user interface, in response to an input from the user, an identifier of one or more connected logical applications, including the second logical application.

10. The method of claim 8 further comprising:
connecting, through an input from an administrator, the first logical application and the second logical application.

11. The method of claim 8 further comprising:
connecting, for a predetermined period of time, the first logical application and the second logical application.

12. The method of claim 8, wherein providing the second functionality is initiated through an input of the user.

13. The method of claim 8, wherein the second functionality is provided when one or more indicators associated with the second functionality are in an active state.

14. The method of claim 8, wherein the second logical application inherits the first functionality from the first logical application such that the second functionality and the first functionality are identical.

15. A system for selecting a plurality of platform-agnostic logical applications and displaying the plurality of platform-agnostic logical applications in a display of a client device, the system comprising:
a non-transitory computer-readable medium programmed to:
receive, at a server side, a first request from a client side to access a first logical application;
fetch a first set of standardized instructions associated with the first logical application, wherein the first set of standardized instructions comprises a first functionality of the first logical application;
transmit the first set of standardized instructions to the client side;
access a first set of client-side code for rendering a first user interface on the client device, the first set of client-side code stored in memory of the client device;
provide, based on the first set of client-side code and the first set of standardized instructions and through the first user interface associated with the first logical application, the first functionality to a user associated with the client device;
receive, at the server side, a second request from the first logical application to access a second logical application;
fetch a second set of standardized instructions associated with the second logical application, wherein the second set of standardized instructions comprises:
a second functionality of the second logical application, wherein the second logical application inherits the first functionality such that the second functionality and the first functionality are identical;
transmit the second set of standardized instructions to the first logical application;
access a second set of client-side code for rendering a second user interface on the client device, the second set of client-side code stored in the memory of the client device; and
provide, based on the second set of client-side code and the second set of standardized instructions and through the second user interface associated with the second logical application, the second functionality to the user associated with the client device,
wherein the first logical application and the second logical application are cloud-based applications.

16. The system of claim 15, wherein the non-transitory computer-readable medium is further programmed to:
receive, at the server side, a third request from the second logical application to access a third logical application;
fetch a third set of standardized instructions associated with the third logical application, wherein the third set of standardized instructions comprises a third functionality of the third logical application;
transmit the third set of standardized instructions to the second logical application;
access a third set of client-side code for rendering a third user interface on the client device, wherein the third set of client-side code is stored on the client side; and
provide, based on the third set of client-side code and the third set of standardized instructions and through the third user interface associated with the third logical application, the third functionality to the user associated with the client device.

17. The system of claim 15, wherein the first set of standardized instructions further comprises one or more identifiers of the second logical application.

18. The system of claim 15, wherein the second logical application is configured to be exclusively accessible from within the first logical application.

19. The system of claim 15, wherein the non-transitory computer-readable medium is further programmed to:
   establish a connection between the first logical application and the second logical application upon receiving a user input.

20. The system of claim 15, wherein the non-transitory computer-readable medium is further programmed to:
   authenticate the user such that the user can access the first logical application and the second logical application on the client device.

* * * * *